US010880527B2

(12) United States Patent
Nakajima et al.

(10) Patent No.: US 10,880,527 B2
(45) Date of Patent: Dec. 29, 2020

(54) VIDEO DISPLAY DEVICE

(71) Applicant: JVC KENWOOD Corporation, Yokohama (JP)

(72) Inventors: Nobuki Nakajima, Yokohama (JP); Takeshi Makabe, Yokohama (JP); Takaaki Saiki, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/384,000

(22) Filed: Apr. 15, 2019

(65) Prior Publication Data

US 2019/0394430 A1    Dec. 26, 2019

(30) Foreign Application Priority Data

Jun. 22, 2018   (JP) .................................. 2018-118662

(51) Int. Cl.
*H04N 5/265*    (2006.01)
*H04N 5/33*    (2006.01)
*H04N 9/31*    (2006.01)
*B64D 43/00*   (2006.01)

(52) U.S. Cl.
CPC ........... *H04N 9/3111* (2013.01); *H04N 5/265* (2013.01); *H04N 9/312* (2013.01); *H04N 9/3164* (2013.01); *B64D 43/00* (2013.01)

(58) Field of Classification Search
CPC ........ G09G 3/2025; H04N 5/33; H04N 5/265; H04N 9/312; H04N 9/3111

USPC ............................ 348/122; 345/204, 589, 24
See application file for complete search history.

(56) References Cited

U.S. PATENT DOCUMENTS

| 8,988,333 | B2 * | 3/2015 | Sato ..................... G09G 3/2025 345/204 |
| 2011/0249014 | A1 * | 10/2011 | Kolstad .................... H04N 5/33 345/589 |
| 2012/0044461 | A1 | 2/2012 | Chang et al. | |

FOREIGN PATENT DOCUMENTS

JP    2013-524662 A    6/2013

OTHER PUBLICATIONS

European Search Report for Counterpart EP; Application No. 19177138.5; dated Jul. 9, 2019.

* cited by examiner

*Primary Examiner* — Albert Kir
(74) *Attorney, Agent, or Firm* — Nath, Goldberg & Meyer; Jerald L. Meyer

(57) ABSTRACT

When gradation of a mixed video signal is equal to or less than a predetermined gradation, a subframe data generator generates subframe data so that an applied voltage to a display element is turned off during a first predetermined period from a start of the frame of a video signal for a visible light image or a video signal for an infrared light image. A light source controller turns on a visible light source after a lapse of a second predetermined period from a start of the frame of the video signal for a visible light image, and turns off the visible light source at the timing when the frame of the video signal for a visible light image is ended.

3 Claims, 5 Drawing Sheets

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 1 | 0 | 0 | 0 | 0 | 0 | 0 | 0 | 0 |
| 2 | 0 | 0 | 0 | 1 | 1 | 0 | 0 | 0 | 0 | 0 | 0 | 0 |
| 3 | 0 | 0 | 0 | 1 | 1 | 1 | 0 | 0 | 0 | 0 | 0 | 0 |
| 4 | 0 | 0 | 0 | 1 | 1 | 1 | 1 | 0 | 0 | 0 | 0 | 0 |
| 5 | 0 | 0 | 0 | 1 | 1 | 1 | 1 | 1 | 0 | 0 | 0 | 0 |
| 6 | 0 | 0 | 0 | 1 | 1 | 1 | 1 | 1 | 1 | 0 | 0 | 0 |
| 7 | 0 | 0 | 0 | 1 | 1 | 1 | 1 | 1 | 1 | 1 | 0 | 0 |
| 8 | 0 | 0 | 0 | 1 | 1 | 1 | 1 | 1 | 1 | 1 | 1 | 0 |
| 9 | 0 | 0 | 0 | 1 | 1 | 1 | 1 | 1 | 1 | 1 | 1 | 1 |
| 10 | 1 | 0 | 0 | 1 | 1 | 1 | 1 | 1 | 1 | 1 | 1 | 1 |
| 11 | 1 | 1 | 0 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 1 | 1 |
| 3 | 0 | 0 | 0 | 0 | 0 | 0 | 0 | 0 | 0 | 1 | 1 | 1 |
| 4 | 0 | 0 | 0 | 0 | 0 | 0 | 0 | 0 | 1 | 1 | 1 | 1 |
| 5 | 0 | 0 | 0 | 0 | 0 | 0 | 0 | 1 | 1 | 1 | 1 | 1 |
| 6 | 0 | 0 | 0 | 0 | 0 | 0 | 1 | 1 | 1 | 1 | 1 | 1 |
| 7 | 0 | 0 | 0 | 0 | 0 | 1 | 1 | 1 | 1 | 1 | 1 | 1 |
| 8 | 0 | 0 | 0 | 0 | 1 | 1 | 1 | 1 | 1 | 1 | 1 | 1 |
| 9 | 0 | 0 | 0 | 1 | 1 | 1 | 1 | 1 | 1 | 1 | 1 | 1 |
| 10 | 0 | 0 | 1 | 1 | 1 | 1 | 1 | 1 | 1 | 1 | 1 | 1 |
| 11 | 0 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

1FRAME

FIG. 6

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 1 | 0 | 0 | 0 | 0 | 0 | 0 | 0 | 0 |
| 2 | 0 | 0 | 0 | 1 | 1 | 0 | 0 | 0 | 0 | 0 | 0 | 0 |
| 3 | 0 | 0 | 0 | 1 | 1 | 1 | 0 | 0 | 0 | 0 | 0 | 0 |
| 4 | 0 | 0 | 0 | 1 | 1 | 1 | 1 | 0 | 0 | 0 | 0 | 0 |
| 5 | 0 | 0 | 0 | 1 | 1 | 1 | 1 | 1 | 0 | 0 | 0 | 0 |
| 6 | 0 | 0 | 0 | 1 | 1 | 1 | 1 | 1 | 1 | 0 | 0 | 0 |
| 7 | 0 | 0 | 0 | 1 | 1 | 1 | 1 | 1 | 1 | 1 | 0 | 0 |
| 8 | 0 | 0 | 0 | 1 | 1 | 1 | 1 | 1 | 1 | 1 | 1 | 0 |
| 9 | 1 | 0 | 0 | 1 | 1 | 1 | 1 | 1 | 1 | 1 | 1 | 1 |
| 10 | 1 | 1 | 0 | 1 | 1 | 1 | 1 | 1 | 1 | 1 | 1 | 1 |
| 11 | 1 | 1 | 0 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

1FRAME

VIDEO DISPLAY DEVICE

CROSS REFERENCE TO RELATED APPLICATION

This application is based upon and claims the benefit of priority under 35 U.S.C. § 119 from Japanese Patent Application No. 2018-118662 filed on Jun. 22, 2018, the entire contents of which are incorporated herein by reference.

BACKGROUND

The present disclosure relates to a video display device that displays both a visible light image and an infrared light image.

During the pilot training of an airplane or a helicopter, not only the actual flying training but also training by a training simulator system capable of reproducing a variety of scenes is effective.

Particularly, in a night flight of the helicopter or the like, in some cases, one of a main pilot and a copilot steers the helicopter by the naked eye, and the other steers the helicopter while wearing night vision goggles. Therefore, there has been developed a simulator system that displays a visible light image and an infrared light image on a screen and simultaneously trains the pilot who does not wear the night vision goggles and the pilot who wears the night vision goggles. Japanese Translation of PCT International Application Publication No. 2013-524662 describes a projector that projects both a visible light image and an infrared light image on the same display device.

SUMMARY

In videos displayed by the simulator system that assumes the night flight, since the visible light image becomes dark, a light intensity of the visible light is low. Meanwhile, it is necessary to increase a light intensity of the infrared light when the infrared light image is displayed. Therefore, when the visible light image and the infrared light image are alternately displayed by a single device, a crosstalk sometimes occurs, and the problem to be solved is to reduce the crosstalk.

An aspect of one or more embodiments provides a video display device including: a display element; a visible light source configured to irradiate visible illumination light; an infrared light source configured to irradiate infrared illumination light; a subframe data generator configured to generate subframe data based on a mixed video signal in which a frame of a video signal for a visible light image and a frame of a video signal for an infrared light image are alternately repeated, the subframe data indicating on and off of an applied voltage to the display element in the frames; a pixel circuit configured to drive the display element based on the subframe data generated by the subframe data generator; and a light source controller configured to control on and off of the visible light source, wherein, when gradation of the mixed video signal is equal to or less than a predetermined gradation, the subframe data generator generates the subframe data so that an applied voltage to the display element is turned off during a first predetermined period from a start of the frame of the video signal for a visible light image or the video signal for an infrared light image, and wherein the light source controller turns on the visible light source after a lapse of a second predetermined period from a start of the frame of the video signal for a visible light image, and turns off the visible light source at a timing when the frame of the video signal for a visible light image is ended.

BRIEF DESCRIPTION OF THE DRAWINGS

FIG. 6 is a diagram illustrating another example of the drive gradation table.

DETAILED DESCRIPTION

A description will be given below of a video display device according to one or more embodiments with reference to the accompanying drawings. In one or more embodiments, a projector device including a reflective liquid crystal display element will be described as an example of the video display device. However, the video display device is not limited to this, and may have a configuration using a transmissive liquid crystal display element.

Figure 1:
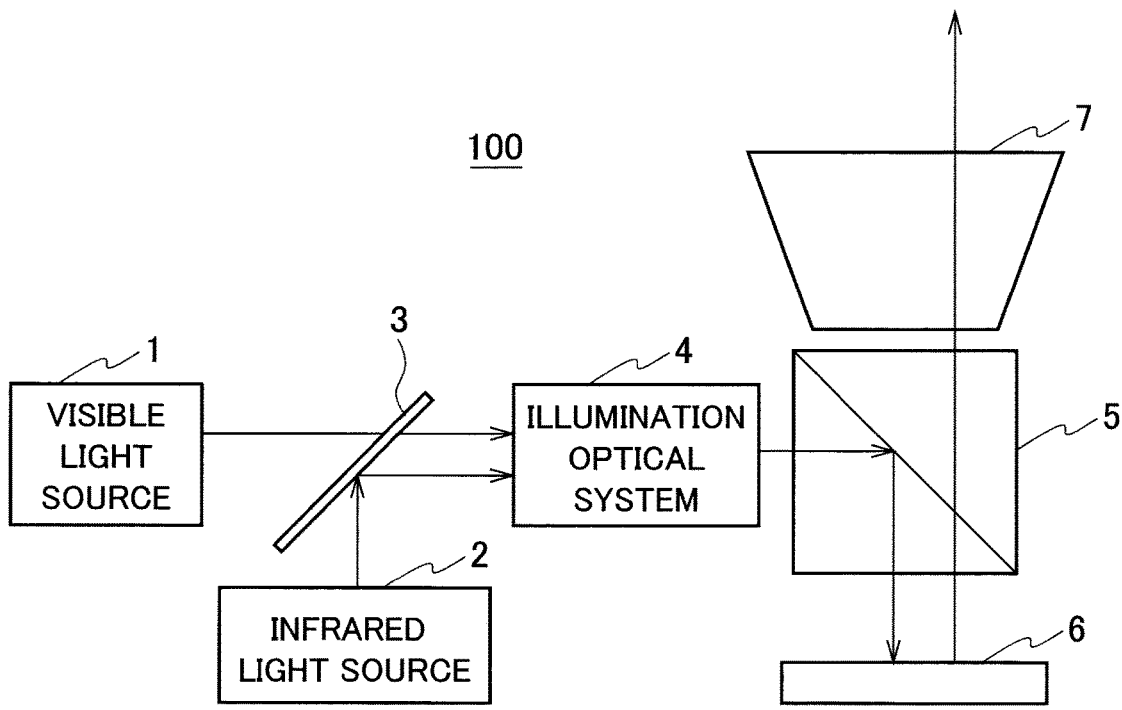
FIG. 1 is a schematic configuration diagram illustrating a video display device according to one or more embodiments.

FIG. 1 shows a schematic configuration of a video display device 100. The video display device 100 includes a visible light source 1, an infrared light source 2, a dichroic mirror 3, an illumination optical system 4, a polarization beam splitter (hereinafter, referred to PBS) 5, a liquid crystal display element 6, and a projection lens 7.

The visible light source 1 irradiates visible illumination light toward the dichroic mirror 3. The infrared light source 2 irradiates infrared illumination light toward the dichroic mirror 3. The dichroic mirror 3 has properties of transmitting visible light in which a wavelength band ranges from 450 nm to 650 nm and reflecting infrared light in which a wavelength band is 700 nm or more. The visible illumination light irradiated from the visible light source 1 transmits through the dichroic mirror 3 and enters the illumination optical system 4. The infrared illumination light emitted from the infrared light source 2 is reflected on the dichroic mirror 3, and enters the illumination optical system 4. Hereinafter, the visible illumination light and the infrared illumination light will be collectively referred to as illumination light.

The PBS 5 has properties of reflecting one of the s-polarized light and p-polarized light and transmitting the other thereof. In one or more embodiments, the PBS 5 is configured to reflect the s-polarized light and to transmit the p-polarized light. An s-polarized light component of the illumination light that has passed through the illumination optical system 4 is reflected on the PBS 5, and enters the liquid crystal display element 6. The p-polarized light of the illumination light that has passed through the illumination optical system 4 transmits through the PBS 5, and is not used as illumination light. The illumination optical system 4 may be configured to integrate polarization states of the illumination light to the s-polarized light by a known method.

Based on subframe data to be described later, the liquid crystal display element 6 optically modulates the illumination light of the s-polarized light and generates video light of the p-polarized light. The video light of the p-polarized light, which is generated by the liquid crystal display element 6, transmits through the PBS 5, is emitted by the projection lens 7, and is projected onto an unillustrated screen or the like whereby a video is displayed.

Figure 2:
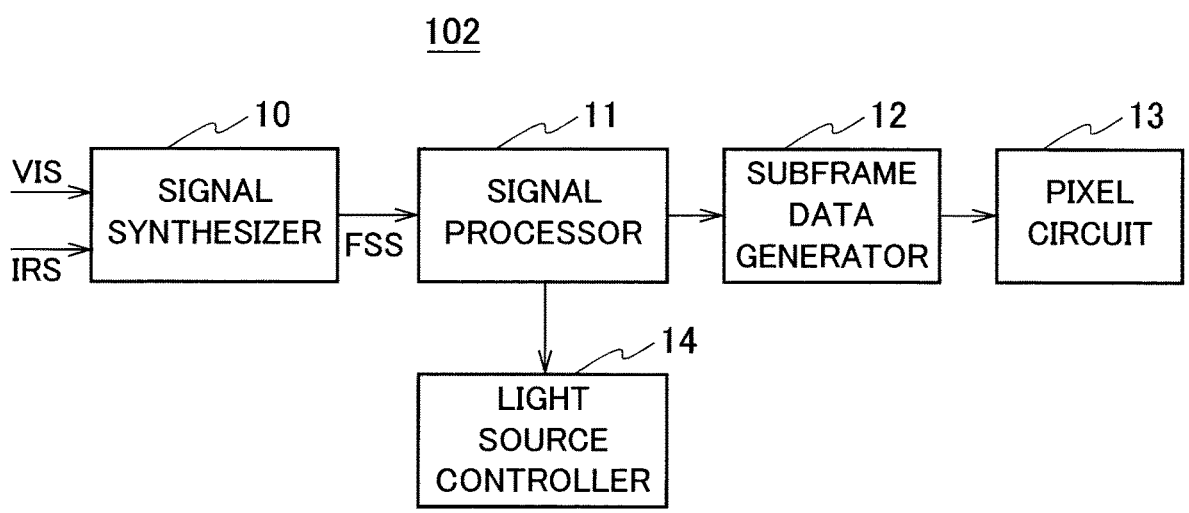
FIG. 2 is a block diagram illustrating a drive circuit of a liquid crystal display element.
Figure 3:
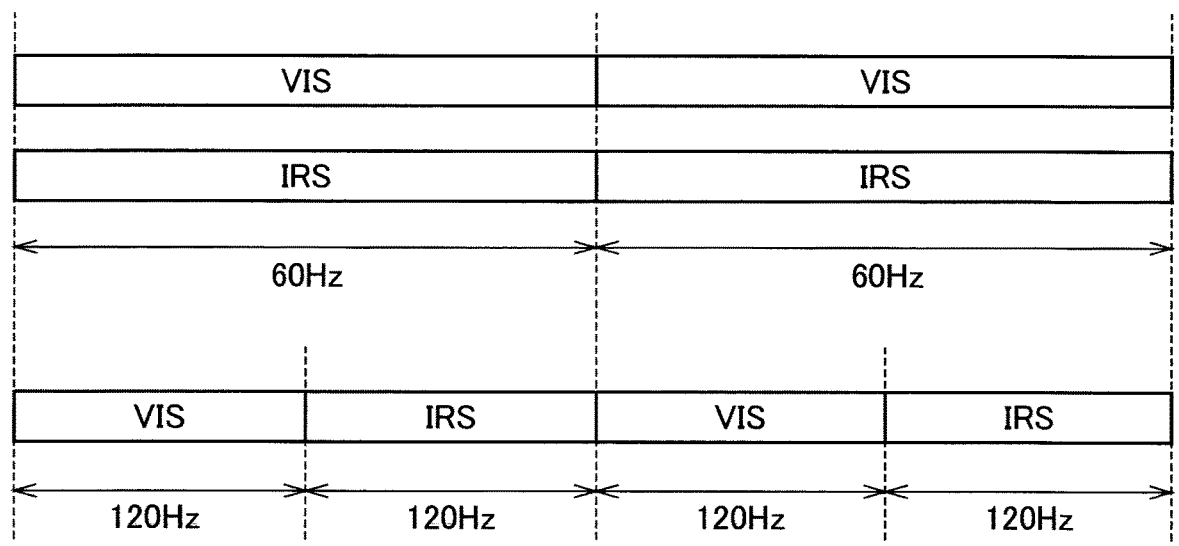
FIG. 3 is a timing chart illustrating an example of signal processing.

FIG. 2 shows a configuration example of a drive circuit 102 that drives the liquid crystal display element 6. The drive circuit 102 includes a signal synthesizer 10, a signal processor 11, a subframe data generator 12, a pixel circuit 13, and a light source controller 14. The signal synthesizer 10 synthesizes a video signal for a visible light image VIS and a video signal for an infrared light image IRS, which are input thereto with each other, and generates a frame sequential signal FSS. As an example, FIG. 3 shows processing in the signal synthesizer 10 in a case where frame rates of both of the video signal for the visible light image VIS and the video signal for the infrared light image IRS are 60 Hz. Display speeds of the video signal for the visible light image VIS and the video signal for the infrared light image IRS are individually doubled, and both thereof are alternately rearranged to be converted into the frame sequential signal FSS with a frame rate of 120 Hz. The frame sequential signal FSS is a mixed video signal in which frames of the video signal for the visible light image VIS and frames of the video signal for the infrared light image IRS are alternately repeated.

FIG. 3 shows a state where the video signal for the visible light image VIS and the video signal for the infrared light image IRS, which are input to the signal processor 11 via the signal synthesizer 10, are input at 60 Hz; however, frequencies of such input signals are not limited to 60 Hz, and may be other frequencies (for example, 50 Hz or 24 Hz). Moreover, the signal processor 11 converts the video signals to the signals with the doubled frequency; however, a multiple in converting the frequency is not limited to double, and may be more than double or may be unchanged.

Furthermore, display periods of the visible light image and the infrared light image do not need to be equal to each other. For example, such a configuration may be adopted in which, within a period of 60 Hz, the visible light image is displayed for a period of ⅓ thereof, and the infrared light image is displayed for a period of ⅔ thereof. It is expected that gradation of the infrared light image is higher than that of the visible light image, and accordingly, the display period of the infrared light image is lengthened, whereby a light intensity of the infrared light image can be kept intense.

The signal processor 11 performs arithmetic operations between neighboring pixels and between frames for the frame sequential signal FSS, thereby generating video data with N (N is a natural number) gradations, and sends the generated video data to the subframe data generator 12. Based on the drive gradation table, the subframe data generator 12 converts the video data with N gradations into subframe data made of 1 and 0.

Figure 4:
FIG. 4 is a diagram illustrating an example of a drive gradation table.

In one or more embodiments, one frame is divided into N pieces of subframes, and on and off of the respective subframes are switched, whereby gradation display is performed. Note that the subframes are denoted by SF1, SF2 . . . and SFN in order from a temporarily prior one. FIG. 4 shows an example of a drive gradation table, and longitudinal columns of the drive gradation table represent the gradations. The subframe data generator 12 generates the subframe data based on values in the drive gradation table, which correspond to the gradations of the video data.

The pixel circuit 13 turns an applied voltage to the liquid crystal display element 6 on and off based on the subframe data. 0 in the subframe data corresponds to off of the applied voltage, and 1 in the subframe data corresponds to on of the applied voltage.

In one or more embodiments, a case of N=12 will be described as an example. Note that the value of N is not limited to 12, and is able to be set to various values. For example, the value of N may be 32 or 64. The drive gradation table in one or more embodiments is configured to be a table in which the subframes which turn on are increased from the temporarily posterior subframe toward the temporarily prior subframe as the gradation rises.

Returning to FIG. 2, the signal processor 11 generates a light source control signal synchronized with the frame sequential signal FSS, and sends the generated light source control signal to the light source controller 14. The light source controller 14 switches the visible light source 1 and the infrared light source 2 on and off based on the light source control signal.

The signal synthesizer 10, the signal processor 11, the subframe data generator 12, and the light source controller 14 may be composed of an integrated circuit that is a hardware, or may be composed of a central processing unit (CPU) and a memory of a computer, and be configured to perform predetermined operations by causing the CPU to execute a computer program (software) stored in the memory. Choice of hardware and software is arbitrary.

Figure 5:
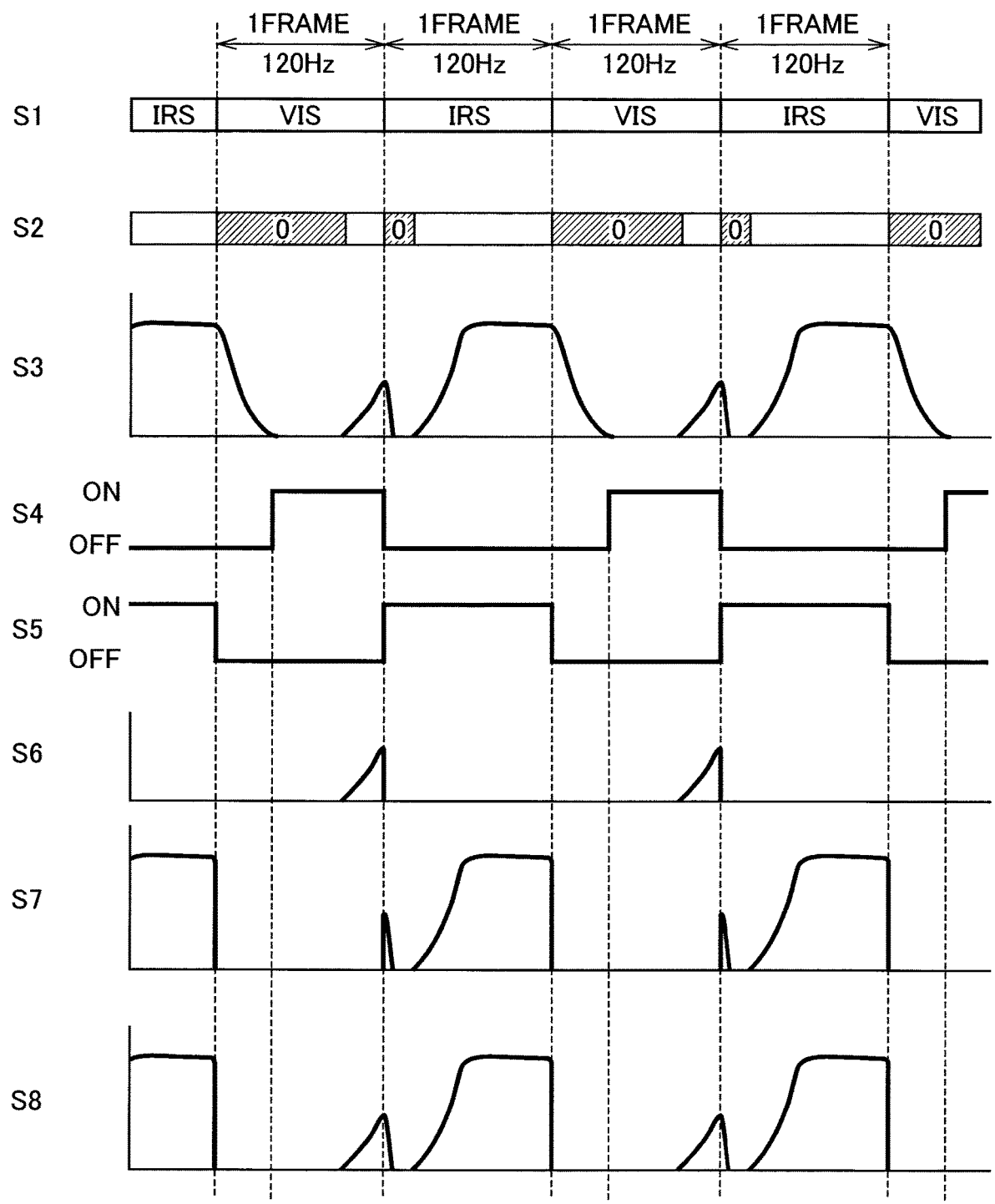
FIG. 5 is a timing chart illustrating a flow until a video signal is displayed.

FIG. 5 shows a state until the video signal is displayed based on the frame sequential signal FSS. S1 indicates the frame sequential signal FSS obtained by synthesizing the video signal for the visible light image VIS and the video signal for the infrared light image IRS with each other. In videos displayed by the simulator system that assumes the night flight, since the visible light image becomes dark, a light intensity of the visible light is low. Meanwhile, it is necessary to increase the intensity of the infrared light when the infrared light image is displayed. Therefore, it is expected that the gradation of the video signal for the visible light image VIS is low, and that the gradation of the video signal for the infrared light image IRS is high.

S2 indicates a subframe data signal generated based on the frame sequential signal FSS. Since the gradation of the video signal for the visible light image VIS is low, a period while the applied voltage is turned on is short. Meanwhile, the gradation of the video signal for the infrared light image IRS is high, a period while the applied voltage is turned on is long.

S3 indicates a drive state of the liquid crystal display element 6. An axis of ordinates represents a light intensity, and S3 shows a state where, in a case of continuing to apply the illumination light to the liquid crystal display element 6, the light intensity of the video light irradiated from the liquid crystal display element 6 is changed. The intensity of the light irradiated from the liquid crystal display element 6 is increased with a certain time constant by turning on the applied voltage to the liquid crystal display element 6, and is decreased with a certain time constant by turning off the applied voltage.

Since the gradation of the video signal for the visible light image VIS is low, the light intensity is rapidly decreased after the applied voltage is turned off, and an influence given to the display of the infrared light image by the video signal for the visible light image VIS is small. Meanwhile, the gradation of the video signal for the infrared light image IRS is high, and it takes time to decrease the light intensity after the applied voltage is turned off. Accordingly, an influence given to the display of the visible light image by the video signal for the infrared light image IRS is large. Specifically, the visible light image is displayed with gradation brighter than an original gradation thereof. Since the gradation of the video signal for the visible light image VIS is low, a degree of the influence by the video signal for the infrared light image IRS is large.

S4 indicates an on/off state of the visible light source 1 controlled by the light source controller 14. S5 indicates an on/off state of the infrared light source 2 controlled by the light source controller 14.

The visible light source 1 is not turned on immediately even when the frame sequential signal FSS is switched to the video signal for the visible light image VIS, and is turned on after the lapse of a predetermined time. Moreover, the visible light source 1 is turned off simultaneously when the frame sequential signal FSS is switched to the video signal for the infrared light image IRS.

As shown in S5, a control signal for the infrared light source 2 is turned on simultaneously when the frame sequential signal FSS is switched to the video signal for the infrared light image IRS, and is turned off when the frame sequential signal FSS is switched to the video signal for the visible light image VIS.

S6 indicates a change of the intensity of the light of the visible light image, the light being irradiated from the projection lens 7, and S7 indicates a change of the intensity of the light of the infrared light image, the light being irradiated from the projection lens 7. Axes of ordinates in S6 and S7 represent the light intensities. As shown in S6, the visible light source 1 is left off immediately after the frame sequential signal FSS is switched to the video signal for the visible light image VIS, and is turned on after the lapse of a predetermined period, and accordingly, an influence given to the light intensity of the visible light image by the video signal for the infrared light image IRS can be suppressed. Meanwhile, the infrared light source 2 is turned on immediately after the frame sequential signal FSS is switched to the video signal for the infrared light image IRS; however, as shown in S7, the light intensity by the video signal for the infrared light image IRS is sufficiently larger than the light intensity by the video signal for the visible light image VIS. Accordingly, an influence of the video signal for the visible light image VIS is negligibly small.

Since the gradation of the visible light image is lower than that of the infrared light image, a degree of crosstalk influence given to the infrared light image by the video signal for the visible light image VIS is small. Accordingly, even if the infrared light source 2 is turned on during an entire period of the frame of the video signal for the infrared light image IRS, the degree of the crosstalk influence is small. Moreover, the infrared light source 2 may always be left on. S8 indicates a light intensity of the infrared light image when the infrared light source 2 is always turned on. It is seen that the video signal for the visible light image VIS is sufficiently smaller than the video signal for the infrared light image IRS, and that the degree of influence of the video signal for the visible light image VIS is small.

The infrared light source 2 is always left on, whereby the light source control can be simplified in comparison with the case of repeating the on and off of the infrared light source 2.

In accordance with one or more embodiments, immediately after the frame of the video signal for the visible light image VIS is switched, the visible light source 1 is not turned on but is turned on after the lapse of a predetermined period. Accordingly, the influence of the video signal for the infrared light image IRS to the visible light image can be suppressed, and the crosstalk can be reduced and eliminated.

Another example of the drive gradation table and timing of on/off control of the visible light source 1 will be described below.

In the above, as shown in FIG. 4, an example is shown of the drive gradation table in which the subframes which turn on are sequentially increased from the temporarily posterior subframe toward the temporarily prior subframe as the gradation rises. However, the drive gradation table is not limited to this. The drive gradation table only needs to be a table in which a temporarily prior subframe is turned off at the time of a low gradation.

FIG. 6 shows another example of the drive gradation table. In accordance with the drive gradation table in FIG. 6, SF4 turns on at the time of Gradation 1, and the subframes which turn on are increased in a temporarily posterior direction as the gradation rises, and SF1 is turned on at Gradation 10. That is, SF1 to SF3 are not turned on up to Gradation 9. At this time, the light source controller 14 only needs to make control so that the visible light source 1 is not turned on during an approximate period equivalent to SF1 to SF3.

Hence, such a configuration only needs to be adopted in which, when the gradation of the video signal is equal to or less than a predetermined gradation, the subframe data is generated based on the drive gradation table in which the visible light source 1 is off during a first predetermined period from a temporal prior in the frame period, and the light source controller 14 turns on the visible light source 1 after a lapse of a second predetermined period since the frame period is switched to the frame period of the video signal for the visible light image VIS.

The predetermined gradation described above is an average picture level (APL) 75 when the entire gradation is APL 100, for example, and when the entire frame period is 100%, the first predetermined period is a period of 25% from the start of the frame, for example, and the second predetermined period is a period of 20% from the start of the frame, for example. Desirably, the second predetermined period is set equal to or less than the first predetermined period. The predetermined gradation, the first predetermined time, and the second predetermined time are appropriately settable.

As described above, in accordance with the video display device according to one or more embodiments, the occurrence of crosstalk can be reduced in the video display device that alternately displays the visible light image and the infrared light image.

Note that the present invention is not limited to one or more embodiments described above, and is modifiable in various ways within the scope without departing from the scope of the present invention.

What is claimed is:
1. A video display device comprising:
a display element;
a visible light source configured to irradiate the display element with visible illumination light;
an infrared light source configured to irradiate the display element with infrared illumination light;
a subframe data generator circuit configured to generate subframe data based on a drive gradation table and a mixed video signal in which a frame of a video signal for a visible light image and a frame of a video signal for an infrared light image are alternately repeated, wherein the frame of a video signal for a visible light image including a set of visible light subframes, the frame of a video signal for an infrared light image including a set of infrared light subframes, the drive gradation table setting on or off state in the set of visible light subframes and the set of infrared light subframes for each of a plurality of gradations, and the subframe data indicating on or off of an applied voltage to the display element in each subframe;

a signal processor configured to generate a light source control signal synchronized with the frame of the video signal for a visible light image and the frame of the video signal for an infrared light image of the mixed video signal;

a pixel circuit configured to drive the display element based on the subframe data generated by the subframe data generator; and a light source controller configured to control on and off of the visible light source based on the light source control signal, wherein, the subframe data generator generates the subframe data so that an applied voltage to the display element is turned off during a first predetermined period of at least one subframe of the set of visible light subframes from a start of the frame of the video signal for a visible light image when a gradation of the video signal for a visible light image is equal to or less than a predetermined gradation, and the applied voltage to the display element is turned off during a second predetermined period of at least one subframe of the set of infrared light subframes from a start of the frame of the video signal for an infrared light image when the video signal for an infrared light image is equal to or less than the predetermined gradation, and wherein the light source controller turns on the visible light source after a lapse of a third predetermined period of at least one subframe of the set of visible light subframes from the start of the frame of the video signal for a visible light image, and turns off the visible light source at a timing when the frame of the video signal for a visible light image is ended, based on the light source control signal.

2. The video display device according to claim 1, wherein the second third predetermined period is set equal to or less than the first predetermined period.

3. The video display device according to claim 1, wherein the light source controller is configured to always turn on the infrared light source during a frame period of the video signal for a visible light image and during a frame period of the video signal for an infrared light image.

\* \* \* \* \*

UNITED STATES PATENT AND TRADEMARK OFFICE
CERTIFICATE OF CORRECTION

| | |
|---|---|
| PATENT NO. | : 10,880,527 B2 |
| APPLICATION NO. | : 16/384000 |
| DATED | : December 29, 2020 |
| INVENTOR(S) | : Nobuki Nakajima, Takeshi Makabe and Takaaki Saiki |

It is certified that error appears in the above-identified patent and that said Letters Patent is hereby corrected as shown below:

Claim 2, Column 8, Line 16, please delete the word "second".

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*